United States Patent
Tawa et al.

(10) Patent No.: US 8,014,235 B2
(45) Date of Patent: Sep. 6, 2011

(54) OPTICAL OUTPUT DEVICE, MAGNETIC STORAGE MEDIUM DRIVE UNIT, AND HEAD SLIDER

(75) Inventors: Fumihiro Tawa, Kawasaki (JP); Wataru Odajima, Kawasaki (JP); Shinya Hasegawa, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 738 days.

(21) Appl. No.: 12/028,567

(22) Filed: Feb. 8, 2008

(65) Prior Publication Data

US 2008/0192616 A1 Aug. 14, 2008

(30) Foreign Application Priority Data

Feb. 14, 2007 (JP) .................. 2007-034005

(51) Int. Cl.
*G11B 11/00* (2006.01)
(52) U.S. Cl. .................................... 369/13.03
(58) Field of Classification Search .............. None
See application file for complete search history.

(56) References Cited

U.S. PATENT DOCUMENTS

| | | | | |
|---|---|---|---|---|
| 6,374,029 | B1* | 4/2002 | Nakano et al. | 385/131 |
| 6,944,112 | B2* | 9/2005 | Challener | 369/112.27 |
| 7,483,345 | B2* | 1/2009 | Song | 369/44.23 |
| 7,609,591 | B2* | 10/2009 | Suh et al. | 369/13.33 |
| 7,755,998 | B2* | 7/2010 | Sugi et al. | 369/112.26 |
| 2003/0128452 | A1* | 7/2003 | McDaniel et al. | 360/59 |
| 2004/0081031 | A1* | 4/2004 | Saga et al. | 369/13.33 |

FOREIGN PATENT DOCUMENTS

| | | |
|---|---|---|
| JP | 2003-228802 | 8/2003 |
| JP | A 2004-158067 | 6/2004 |
| JP | A 2005-515578 | 5/2005 |
| JP | 2007-280572 | 10/2007 |
| JP | 2008-90954 | 4/2008 |

\* cited by examiner

*Primary Examiner* — Joseph Feild
*Assistant Examiner* — Henok Heyi
(74) *Attorney, Agent, or Firm* — Greer, Burns & Crain, Ltd.

(57) ABSTRACT

An optical device includes a clad composed of a material having a first refractive index, a core which is embedded in the clad, composed of a material having a second refractive index different from the first refractive index, and tapers toward the end-point thereof, and a light-transmitting layer which is composed of a material different from the material having the second refractive index and cuts across an optical path at the end-point thereof.

5 Claims, 17 Drawing Sheets

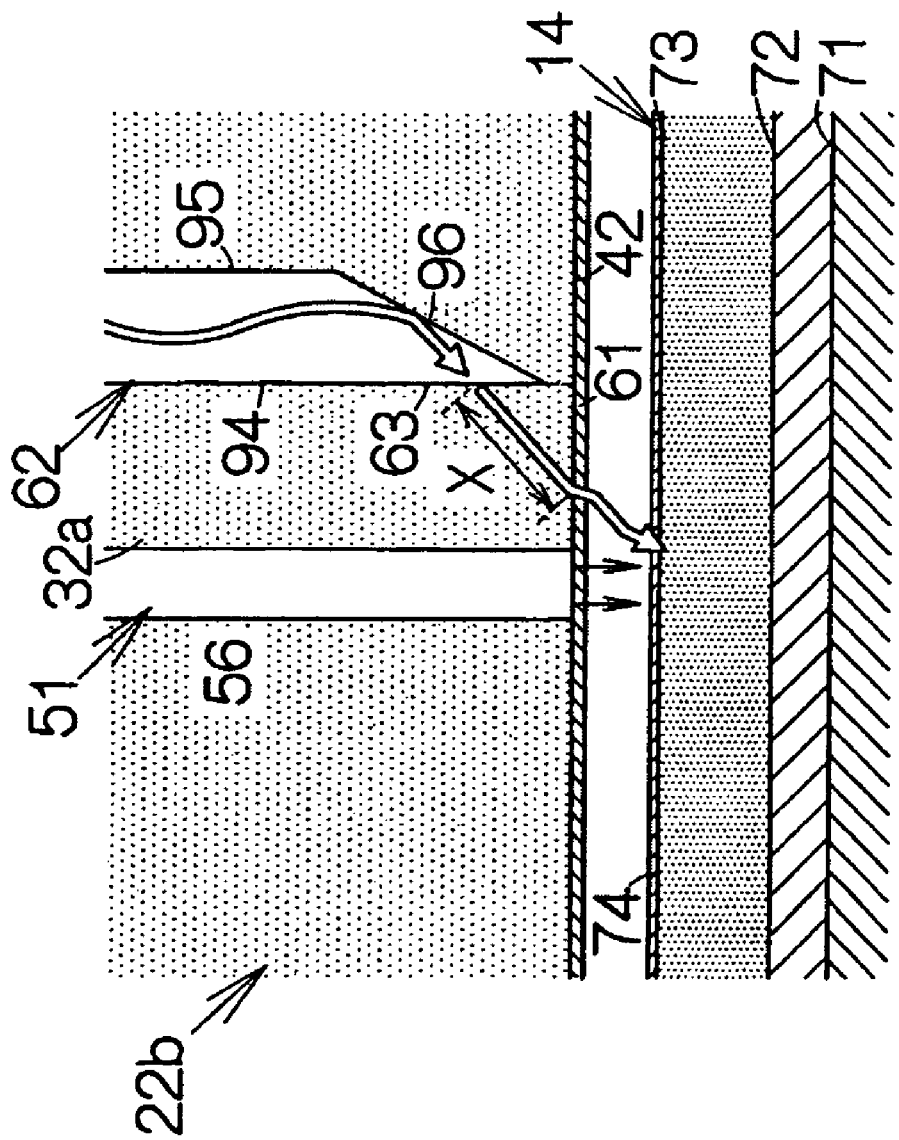

OPTICAL OUTPUT DEVICE, MAGNETIC STORAGE MEDIUM DRIVE UNIT, AND HEAD SLIDER

The present application describes an optical output device for emitting light from the end of an optical waveguide.

BACKGROUND

An optical waveguide which tapers toward the end thereof is widely known. Such an optical waveguide is widely used when producing near-field light. Utilization of such near-field light is sought after at the time of writing magnetic information. When a recording layer is heated by near-field light, the coercivity of the recording layer decreases. By writing magnetic information into the recording layer with the coercivity thus decreased, it is possible to increase resistance to magnetization within the recording layer against so-called heat fluctuations.

SUMMARY

In accordance with an aspect of the application, an optical output device includes a clad composed of a material having a first refractive index, a core which is embedded in the clad, composed of a material having a second refractive index different from the first refractive index, and tapers toward the end-point thereof, and a light-transmitting layer which is composed of a material different from said material having said second refractive index and cuts across an optical path at the end-point thereof.

BRIEF DESCRIPTION OF THE DRAWINGS

FIG. 17 is a cross-sectional view schematically illustrating the structure of a flying head slider in accordance with the third embodiment of the present invention.

DETAILED DESCRIPTION

Hereinafter, one embodiment of the present invention will be described with reference to the accompanying drawings.

Figure 1:
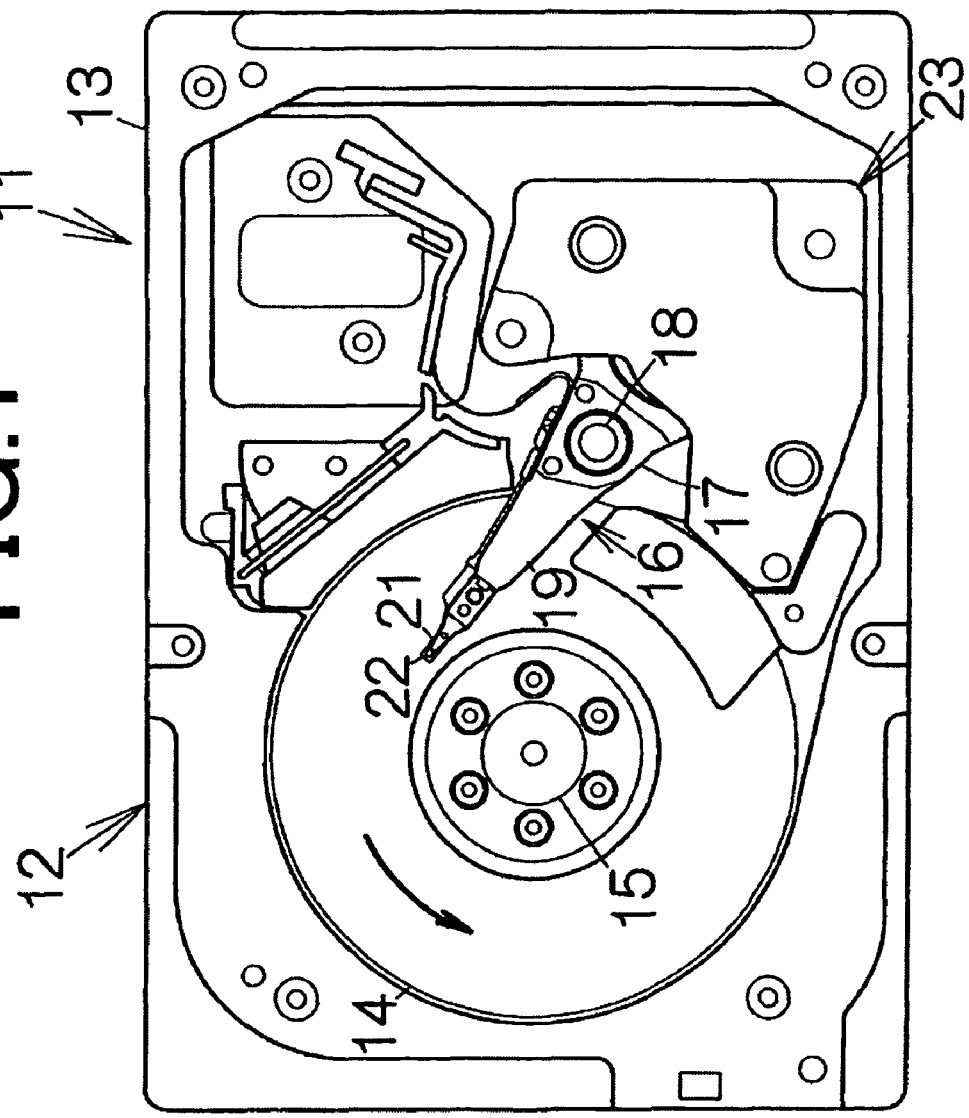
FIG. 1 is a plan view schematically illustrating one specific example of a storage medium drive unit, i.e., the internal structure of a hard disk drive, in accordance with the present invention.

FIG. 1 schematically shows one specific example of a storage medium drive unit, i.e., the internal structure of a hard disk drive (HDD), in accordance with the present invention. This HDD 11 is provided with an enclosure, i.e., a housing 12. The housing 12 is comprised of a box-shaped base 13 and a cover (not shown in the figure). The base 13 divides off the internal space, i.e., the housing space of, for example, a flat rectangular solid. The base 13 may be formed from a metal material, such as aluminum, by means of casting. The cover is coupled with the opening of the base 13. The housing space is hermetically sealed between the cover and the base 13. The cover may be cast from a single sheet of plate material by means of, for example, press working.

In the housing space, two or more magnetic disks 14 are housed as storage media. The magnetic disks 14 are mounted on the rotational axis of a spindle motor 15. The spindle motor 15 is capable of rotating the magnetic disks 14 at a high speed of, for example, 5400 rpm, 7200 rpm, 10000 rpm or 15000 rpm. So-called perpendicular magnetic disks are used for the magnetic disks 14.

A carriage 16 is further housed in the housing space. This carriage 16 is provided with a carriage block 17. The carriage block 17 is rotatably coupled with a spindle 18 extending in a vertical direction. In the carriage block 17, there is divided off a rigid carriage arm 19 extending in a horizontal direction from the spindle 18. The carriage block 17 may be cast from aluminum by means of, for example, casting. As heretofore known, one carriage arm 19 is disposed between each two adjacent magnetic disks 14.

A head suspension 21 is attached to the front edge of the carriage arm 19. The head suspension 21 extends forward from the front edge of the carriage arm 19. A flying head slider 22 is supported at the anterior end of the head suspension 21. The flying head slider 22 is faced to the surfaces of the magnetic disks 14. As heretofore known, two head suspensions 21 are supported by the carriage arm 19 between two adjacent magnetic disks 14.

An electromagnetic conversion element is mounted on the flying head slider 22. The details of the electromagnetic conversion element will be described later. A pressing force works upon the flying head slider 22 from the head suspension 21 toward the surfaces of the magnetic disks 14. When the magnetic disks 14 rotate, an air flow is produced along the surfaces of the magnetic disks 14. A buoyant force works upon the flying head slider 22 due to the effect of this air flow. As the result of a balance being reached between the pressing force and the buoyant force of the head suspension 21, the flying head slider 22 can continue to float with a relatively high degree of rigidity while the magnetic disks 14 are rotating.

A source of motive power, i.e., a voice coil motor (VCM) 23 is connected to the carriage block 17. The carriage block 17 can rotate around the spindle 18 due to the function of this VCM 23. The oscillating movement of the carriage arm 19 and the head suspension 21 is realized by such rotation of the carriage block 17. When the carriage arm 19 oscillatingly moves around the spindle 18 while the flying head slider 22 is afloat, the flying head slider 22 can move across the surfaces of the magnetic disks 14 in a radial direction. According to such the movement of the flying head slider 22 in the radial direction, the electromagnetic conversion element is positioned on a targeted recording track.

Figure 2:
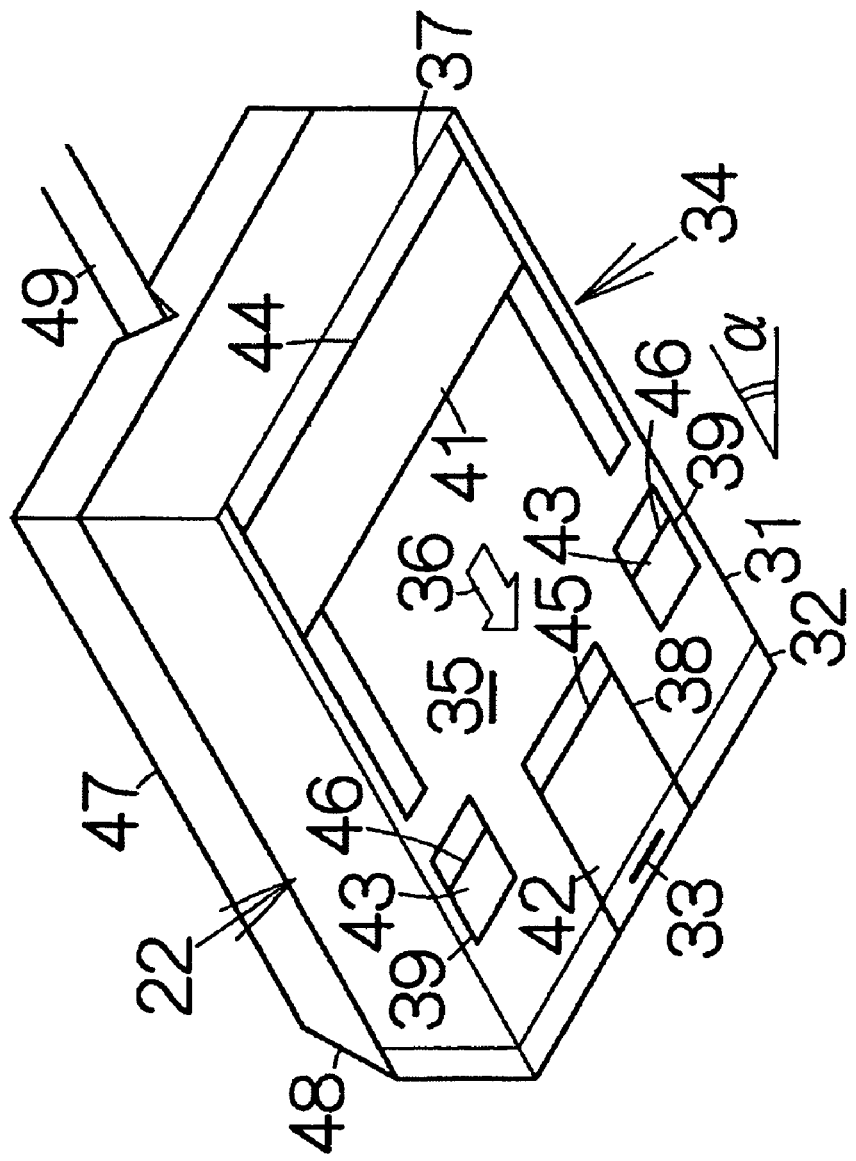
FIG. 2 is a perspective view schematically illustrating the structure of a head slider in accordance with one specific example.

FIG. 2 shows a flying head slider 22 in accordance with one specific example. This flying head slider 22 is provided with a slider body 31 formed into, for example, a flat rectangular solid. An insulating nonmagnetic film, i.e., an element-containing film 32 is laminated on the air outflow end face of the slider body 31. The electromagnetic conversion element 33 mentioned above is built into this element-containing film 32. The details of the electromagnetic conversion element 33 will be described later.

The slider body 31 may be formed from a hard nonmagnetic material, such as $Al_2O_3$—TiC (AlTiC). The element-containing film 32 may be formed from a relatively flexible insulating nonmagnetic material, such as $Al_2O_3$ (alumina) having a refractive index of 1.76. The slider body 31 faces to the magnetic disks 14 on the side of a surface opposite to the media, i.e., an air bearing surface 34. The air bearing surface 34 composes a certain surface. A flat base surface 35, i.e., a reference surface is defined for the air bearing surface 34. When the magnetic disks 14 rotate, an air flow 36 works upon the air bearing surface 34 from the anterior end toward the posterior end of the slider body 31.

On the air bearing surface 34, there is formed a line of a front rail 37 rising from the base surface 35 on the upstream side, i.e., the air inflow side of the above-noted air flow 36. The front rail 37 extends along the air inflow end of the base surface 35 in the slider's width direction. Likewise, on the air bearing surface 34, there is formed a rear rail 38 rising from the base surface 35 on the downstream side, i.e., the air outflow side. The rear rail 38 is disposed in the middle position of the slider's width direction.

On the air bearing surface 34, there is further formed a pair of left- and right-side auxiliary rear rails 39, 39 rising from the base surface 35 on the air outflow side. The auxiliary rear rails 39, 39 are respectively disposed along the left- and right-side edges of the base surface 35. As a result, the auxiliary rear rails 39, 39 are disposed at a given interval from each other in the slider's width direction. The rear rail 38 is disposed between the auxiliary rear rails 39, 39.

So-called air bearing surfaces (ABSs) 41, 42 and 43 are defined for the top surfaces of the front rail 37, rear rail 38 and auxiliary rear rails 39, 39. The air inflow ends of the air bearing surfaces 41, 42 and 43 are connected to the top surfaces of the rails 37, 38 and 39 by steps 44, 45 and 46. The air flow 36 produced according to the rotation of the magnetic disks 14 is received by the air bearing surface 34. At this time, a relatively high positive pressure, i.e., buoyant force is produced in the air bearing surfaces 41, 42 and 43 by the effect of the steps 44, 45 and 46. In addition, a high negative pressure is produced at the back of, i.e., behind the front rail 37. According to a balance between the buoyant force and the negative pressure, the floating position of the flying head slider 22 is established. Note that the configuration of the flying head slider 22 is not limited to such a configuration as described above.

A coupler element 47 is adhered onto the back surface of the flying head slider 22 defined for the backside of the air bearing surface 34. The flying head slider 22 is mounted on the head suspension 21 with the coupler element 47. A reflecting surface 48 is defined for one end of the coupler element 47. One end of an optical fiber 49 is coupled with the other end of the coupler element 47. The other end of the optical fiber 49 is coupled with a light source (not shown in the figure), such as a laser diode (LD), mounted on, for example, the carriage arm 19. Light supplied from the LD reflects off the reflecting surface 48. The reflected light enters the back surface of the flying head slider 22.

Figure 3:
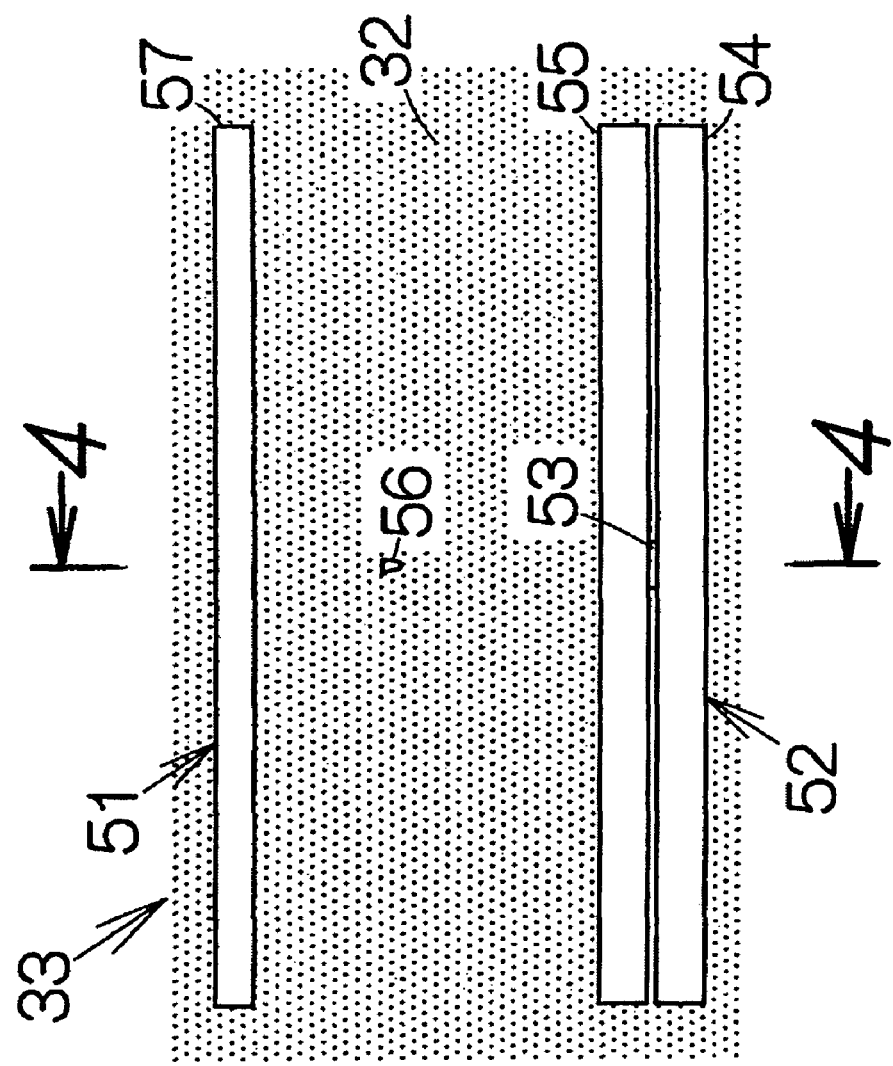
FIG. 3 is an enlarged view of an electromagnetic conversion element.

FIG. 3 shows the details of the electromagnetic conversion element 33. The electromagnetic conversion element 33 is provided with a writing head element, i.e., a single magnetic pole head 51, and a reading head element 52. As heretofore known, the single magnetic pole head 51 can write binary information to the magnetic disks 14 utilizing a magnetic field generated by, for example, a magnetic coil. A magnetoresistance effect (MR) element, such as a giant magnetoresistance effect (GMR) element or a tunneling magnetoresistance effect (TMR) element, may be used for the reading head element 52. As heretofore known, the reading head element 52 can detect binary information based on resistance which varies according to a magnetic field exerted from the magnetic disks 14.

The single magnetic pole head 51 and the reading head element 52 are embedded in the element-containing film 32. In the reading head element 52, a magnetoresistance effect film 53, such as a tunnel junction film, is held between a pair of upper and lower conductive layers, i.e., between a lower shield layer 54 and an upper shield layer 55. The lower shield layer 54 and the upper shield layer 55 may be formed from a magnetic material, such as FeN or NiFe. The interval between the lower shield layer 54 and the upper shield layer 55 determines the resolution of magnetic recording on the magnetic disks 14 in the track line direction thereof.

Figure 4:
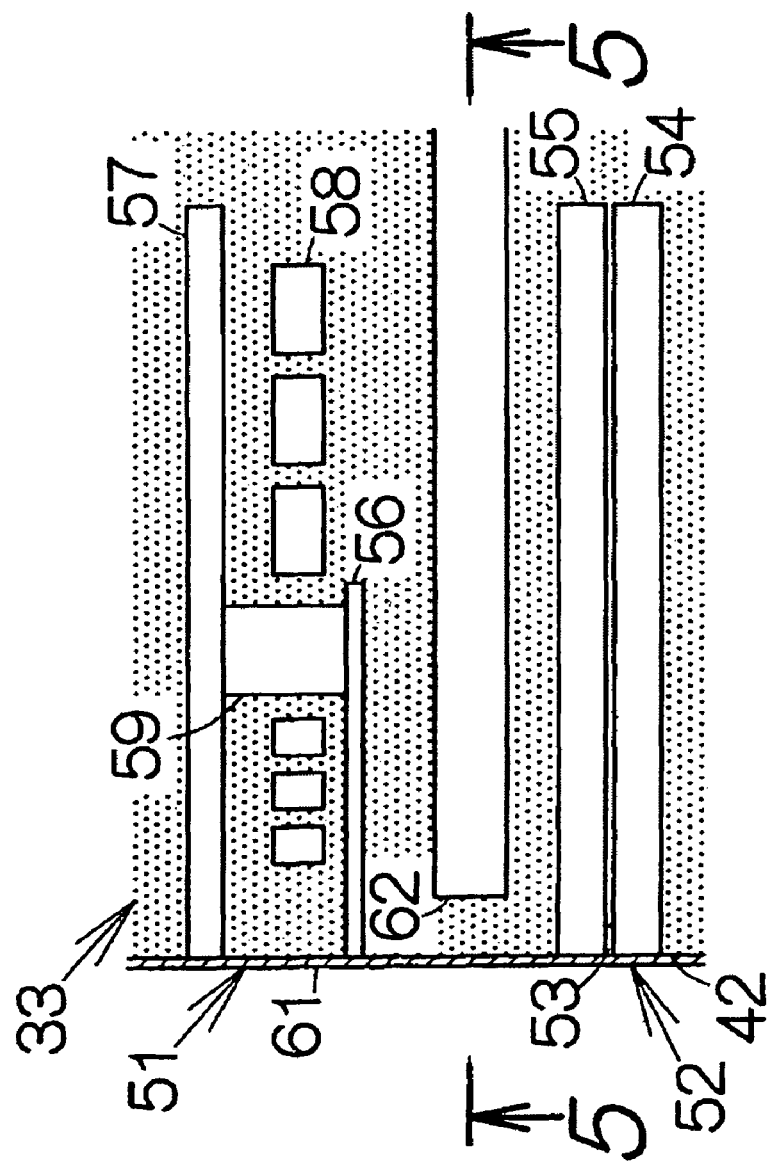
FIG. 4 is a cross-sectional view taken along the line 4-4 of FIG. 3.

The single magnetic pole head 51 is provided with a main magnetic pole 56 and an auxiliary magnetic pole 57 exposed on the air bearing surface 42 and extending from the front edge backward. The main magnetic pole 56 and the auxiliary magnetic pole 57 may be formed from a magnetic material, such as FeN or NiFe. Referring to FIG. 3 along with FIG. 4, a magnetic coil, i.e., a thin-film coil 58 is formed between the main magnetic pole 56 and the auxiliary magnetic pole 57. The posterior end of the main magnetic pole 56 is magnetically coupled with the auxiliary magnetic pole 57 at the middle position of the thin-film coil 58 by the coupling piece 59. In this way, the main magnetic pole 56, the auxiliary magnetic pole 57 and the coupling piece 59 form a magnetic core penetrating through the middle position of the thin-film coil 58.

On the air bearing surface 42, there is formed a protective film 61 on the surfaces of the slider body 31 and the element-containing film 32. The above-noted electromagnetic conversion element 33 exposes the reading gap and the writing gap thereof from the surface of the element-containing film 32 on the air outflow side of the air bearing surface 42. The protective film 61 covers the reading gap and the writing gap of the electromagnetic conversion element 33. A diamond-like carbon (DLC) having a refractive index of 2.03, for example, may be used for the protective film 61. The protective film 61 may be extended with a uniform film thickness. The film thickness may be set to approximately, for example, 5 nm.

An optical waveguide, i.e., a core 62 is embedded in the element-containing film 32 between the single magnetic pole head 51 and the reading head element 52. The middle lines in the core width direction of the single magnetic pole head 51, reading head element 52 and core 62 agree with each other. TiO$_2$ having a refractive index of 2.40, for example, may be used for the core 62. The core 62 has a refractive index larger than that of the element-containing film 32. The core 62 extends from the back surface of the flying head slider 22 toward the air bearing surface 42. The posterior end of the core 62 is connected to the above-noted coupler element 47. In this way, light is supplied from the coupler element 47 to the core 62.

Figure 5:
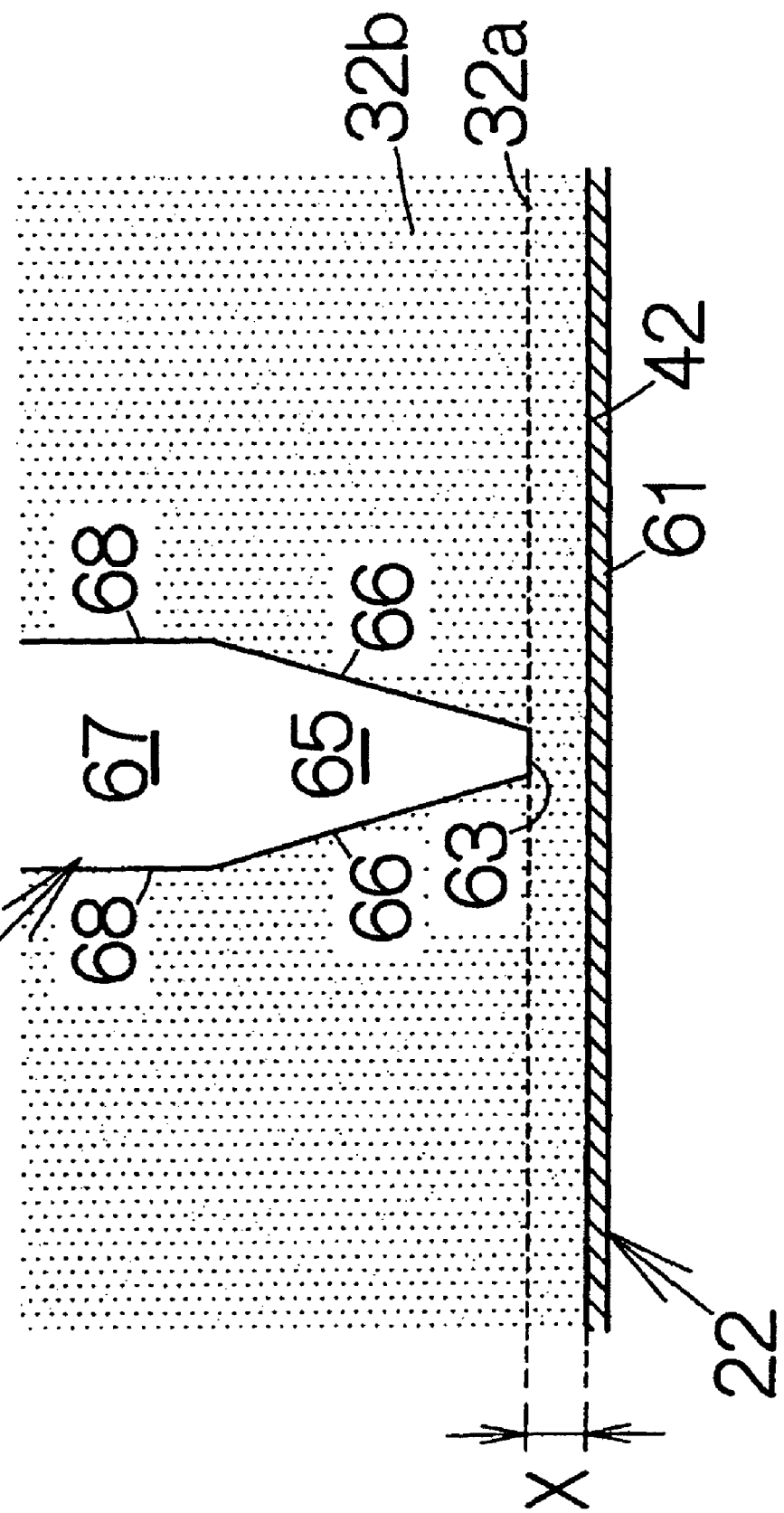
FIG. 5 is a cross-sectional view taken along the line 5-5 of FIG. 4.

As shown in FIG. 5, the end-point, i.e., the anterior end of the core 62 is divided off in a position set back by a predetermined amount of recession X from the air bearing surface 42. Within the element-containing film 32, there is divided off a light-transmitting layer 32a which cuts across an optical path at the anterior end of the core 62, i.e., at an opening 63. The light-transmitting layer 32a extends along the air bearing surface 42. The film thickness of the light-transmitting layer 32a agrees with the amount of recession X. The amount of recession X is set to approximately, for example, 130 nm to 200 nm. The core 62 is embedded in a clad 32b divided off at the back of the light-transmitting layer 32a. A transparent hard material is used for the light-transmitting layer 32a. Here, both the light-transmitting layer 32a and the clad 32b are formed from alumina.

The core 62 divides off a tapered path 65 which divides off the opening 63 at the anterior end thereof. The tapered path 65 is divided off by sloped boundary surfaces 66 which approach to each other as they near the air bearing surface 42. The anterior end of a uniform path 67 is connected to the posterior end of the tapered path 65. The uniform path 67 is divided off by vertical boundary surfaces 68 facing to each other at a uniform interval. The vertical boundary surfaces 68 are orthogonal to the air bearing surface 42.

Figure 6:
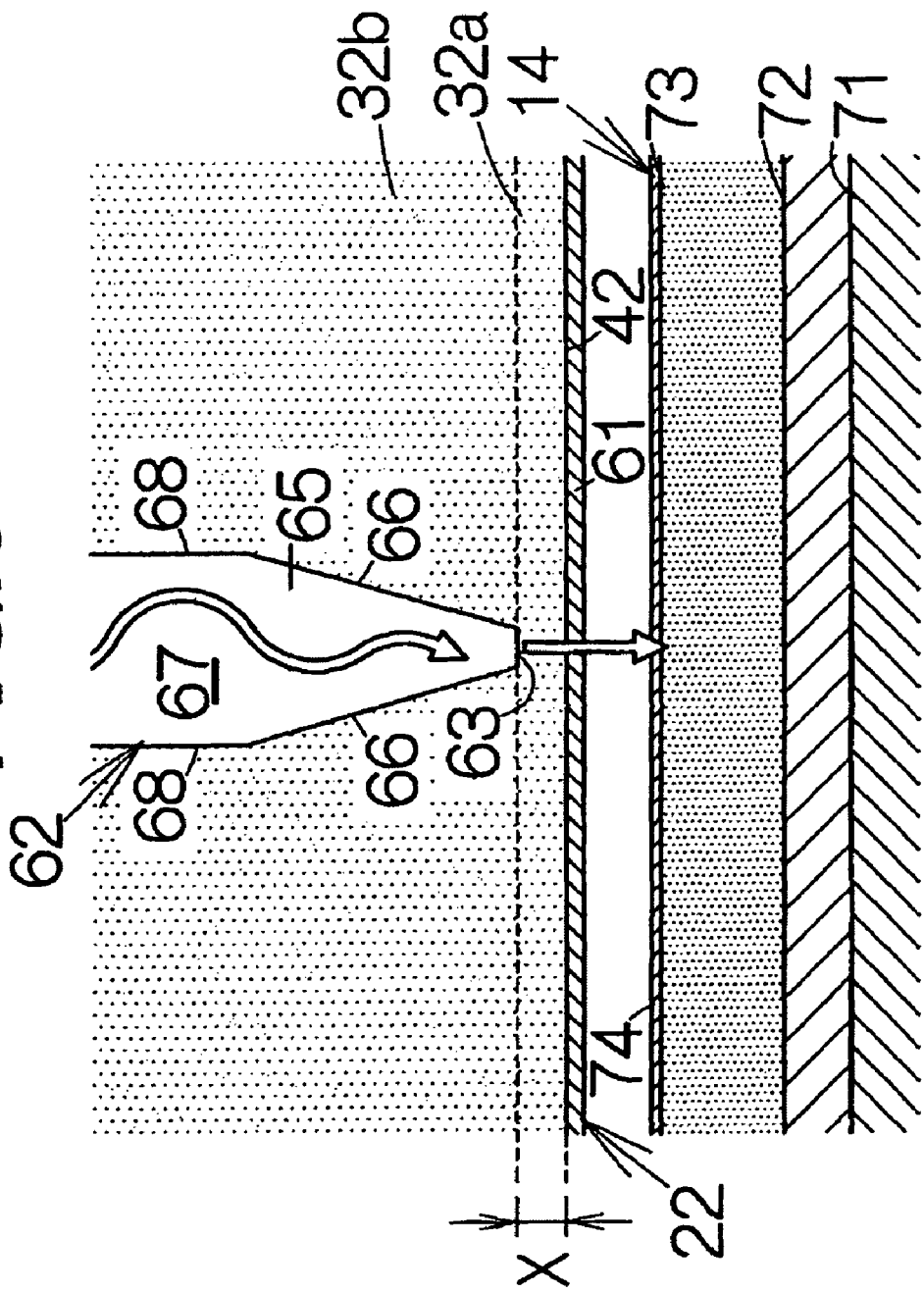
FIG. 6 is a cross-sectional view schematically illustrating a condition in which light is irradiated from a head slider at a magnetic disk.

As shown in FIG. 6, the air bearing surface 42 is faced to the surfaces of the magnetic disks 14 while the flying head slider 22 is afloat. The magnetic disk 14 is provided with a substrate 71 as a supporting base. A glass substrate, an aluminum substrate or a silicon substrate, for example, may be used for the substrate 71. A soft magnetic backlayer 72 extends across the surface of the substrate 71. A CoNbZr film, for example, may be used for the backlayer 72. In the backlayer 72, an axis of easy magnetization is established in an in-plane direction defined as being parallel with the surface of the substrate 71.

A magnetic recording layer 73 extends across the surface of the backlayer 72. A TbFeCo film, for example, may be used for the magnetic recording layer 73. The refractive index of the TbFeCo film is set to approximately 3.13. In the magnetic recording layer 73, an axis of easy magnetization is established in a vertical direction orthogonal to the surface of the substrate 71. The magnetic recording layer 73 has a film thickness of, for example, approximately 100 nm. The surface of the magnetic recording layer 73 is covered with a protective film 74. DLC, for example, is used for the protective film 74. The protective film 74 has a film thickness of, for example, approximately 3 nm. The floating amount of the flying head slider 22 is set to, for example, approximately 15 nm.

The flying head slider 22 is positioned on a targeted recording track on the magnetic disks 14. Light is supplied from the LD to the core 62 through the optical fiber 49 and the coupler element 47. The light converges toward the opening 63 by the effect of the vertical boundary surfaces 68 and the sloped boundary surfaces 66. The light is irradiated from the opening 63 at the magnetic recording layer 73. The light passes through the light-transmitting layer 32a. The energy of the light is converted to thermal energy by the magnetic recording layer 73. The magnetic recording layer 73 is thus heated and the temperature thereof rises. As a result, the coercivity of the magnetic recording layer 73 decreases.

At this time, a writing current is supplied to the thin-film coil 58. A magnetic field is generated at the thin-film coil 58. A magnetic flux flows through the main magnetic pole 56, the auxiliary magnetic pole 57 and the coupling piece 59. The magnetic flux leaks out of the air bearing surface 42. The leaking magnetic flux forms a recording magnetic field. In this way, binary information is written to the magnetic disks 14. As the electromagnetic conversion element 33 passes away, the temperature of the magnetic recording layer 73 returns to room temperature and the coercivity of the magnetic recording layer 73 increases. As a result, the magnetic recording layer 73 can reliably retain the binary information.

The inventor et al. verified the effect of the present invention based on a simulation. At the time of verification, the simulation was carried out based on a finite difference time domain (FDTD) method. The ratio of the amount of light irradiated from the core 62 to the amount of light reaching the magnetic recording layer 73, i.e., a first ratio, was calculated according to the simulation. Likewise, the ratio of the amount of light irradiated from the core 62 to the amount of light reflected toward the core 62, i.e., a second ratio, was calculated. The first and second ratios were calculated for each amount of recession X, i.e., each film thickness of the light-transmitting layer 32a.

At the time of the simulation, the above-noted flying head slider 22 was used. The wavelength of light was set to 660 nm. The thickness of the protective film 61 of the flying head slider 22 was set to 5 nm. The floating amount of the flying head slider 22 was set to 15 nm. The thickness of the protective film 74 of the magnetic disk 14 was set to 3 nm. The film thickness of the magnetic recording layer 73 was set to 100 nm. Note that an air layer was provided between the flying head slider 22 and the magnetic disk 14. The refractive index of the air layer was set to 1.

Figure 7:
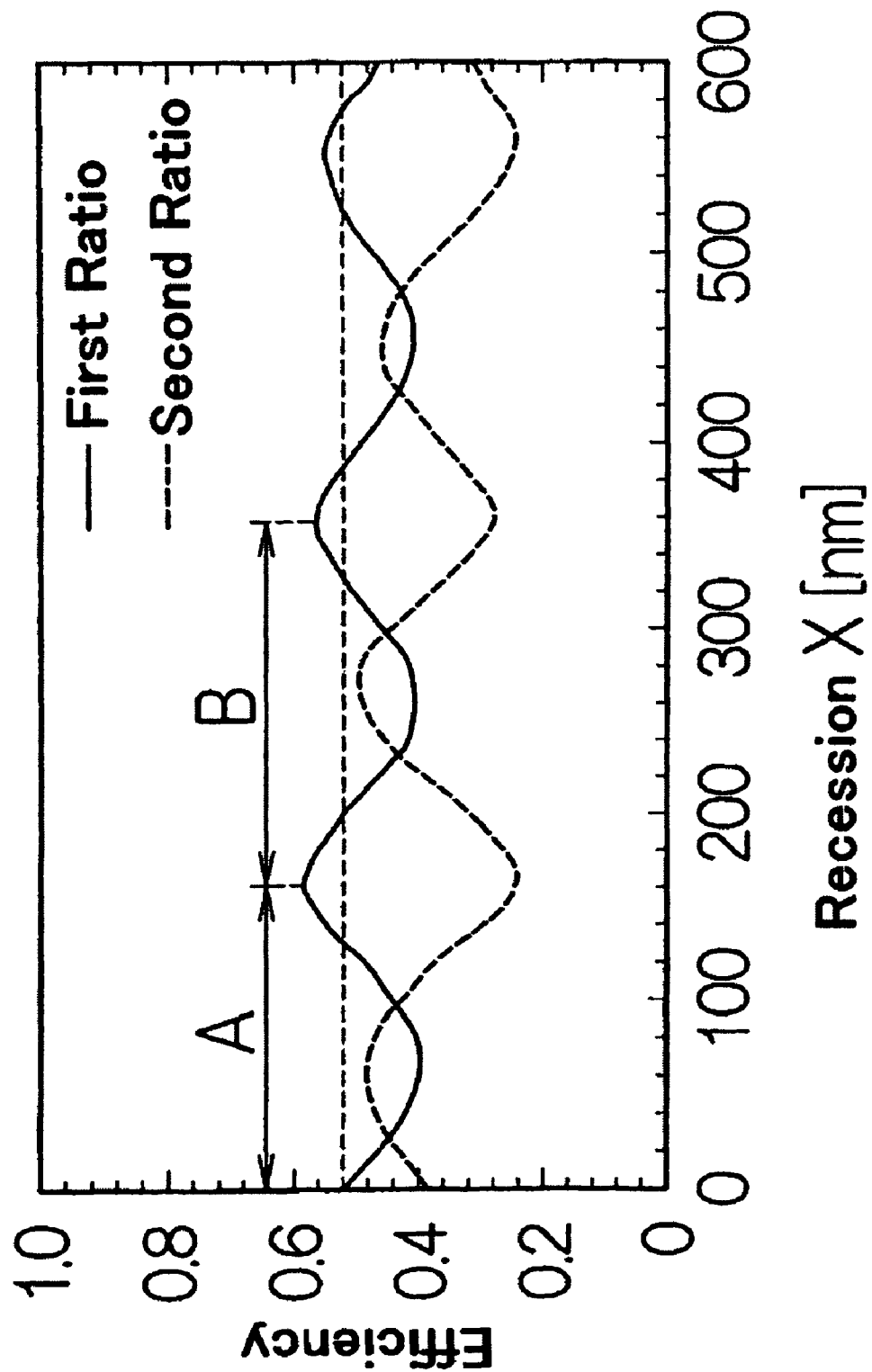
FIG. 7 is a graph illustrating the relationship between the film thickness of a light-transmitting layer and the arrival efficiency of light.

As a result, both the first and second ratios varied according to a waveform, the amplitude of which increased and decreased cyclically according to an increase in the travel distance of light, i.e., an increase in the amount of recession X, as shown in FIG. 7. Consequently, when the amount of recession X was set to a range from 130 nm to 200 nm, for example, there was obtained an optical power ratio larger than that calculated when the amount of recession X was set to 0, i.e., the opening 63 was exposed to the air bearing surface 42. Ranges for realizing a large optical power ratio were encountered in a periodic manner. Thus, it was confirmed that when the amount of recession X was set to a predetermined numerical range, the light reached the magnetic recording layer 73 with an even more adequate optical power than before.

Note that a difference between an interval A to the first peak position of the first optical power ratio and an interval B from the first peak position to the second peak position of the first optical power ratio is considered to be due to the effect of the refractive index of the air layer, the protective film 61 and the protective film 74. Note that in general, DLC used for the protective films 61 and 74 spectrographically has a large absorption coefficient. However, it is possible to ignore the amount of light absorbed by the protective films 61 and 74 at the time of the simulation since the thicknesses of the protective films 61 and 74 are extremely small.

Figure 8:
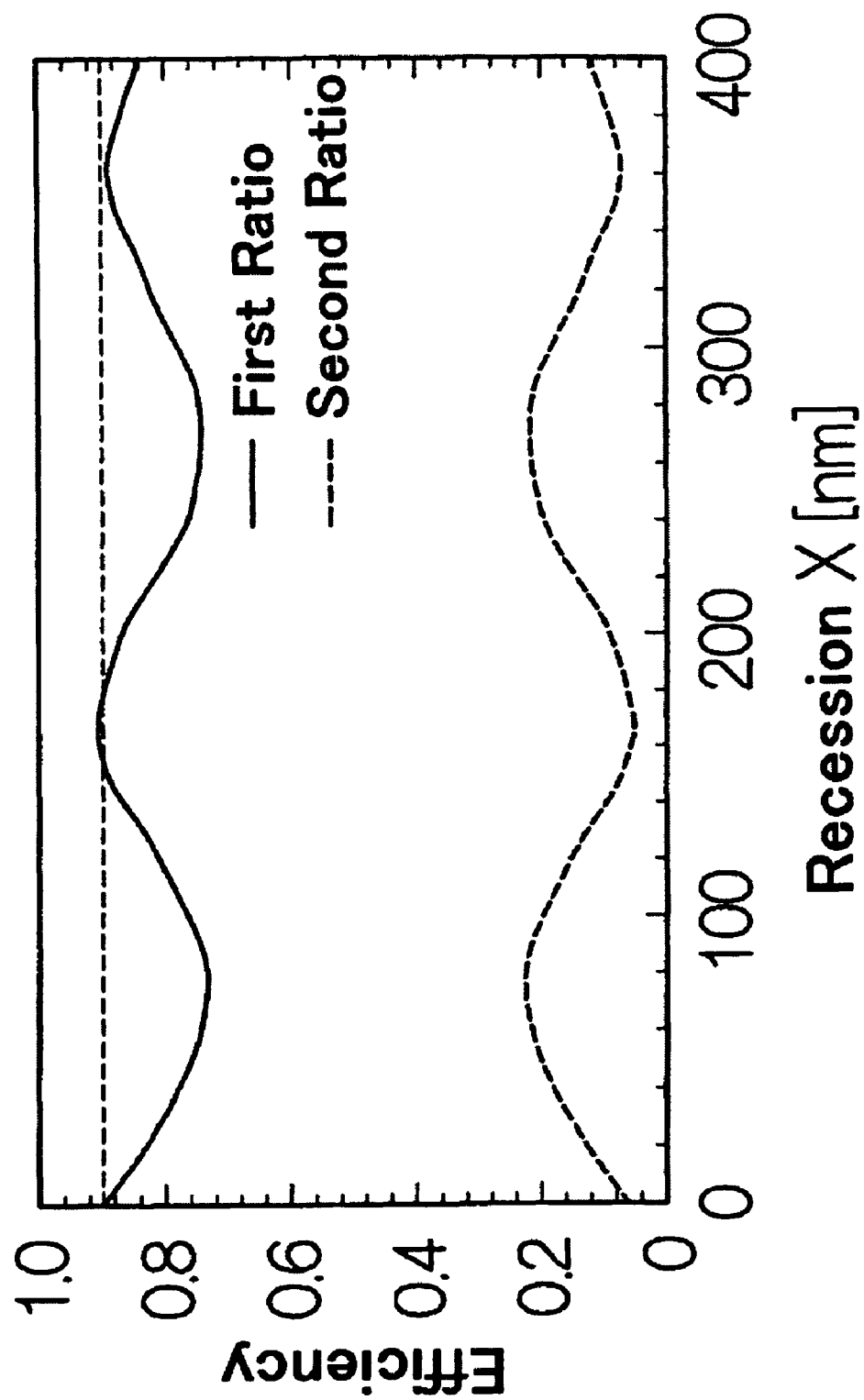
FIG. 8 is another graph illustrating the relationship between the film thickness of a light-transmitting layer and the arrival efficiency of light.
Figure 9:
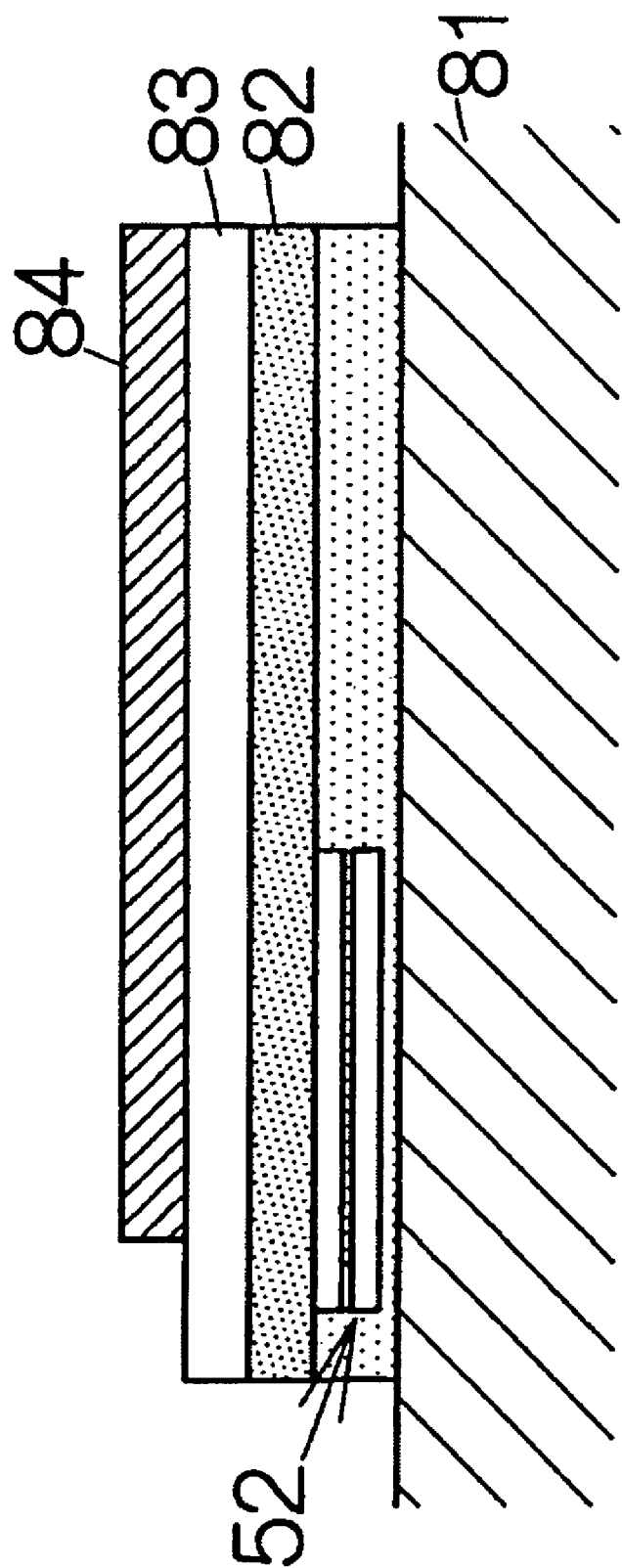
FIG. 9 is a cross-sectional view schematically illustrating a condition in which a clad and a core are formed on a reading head.

Next, the film thickness of the magnetic recording layer 73 was changed to 10 nm. Other conditions were set in the same way as described above. Under these conditions, the first and second ratios were calculated. As a result, both the first and second ratios varied according to a waveform the amplitude of which increased and decreased cyclically according to an increase in the amount of recession X, as shown in FIG. 8. When the amount of recession X was set to a range from 150 nm to 180 nm, for example, there was obtained an optical power ratio larger than that calculated when the opening 63 of the core 62 was exposed to the air bearing surface 42. Thus, it was confirmed that light reached the magnetic recording layer 73 with an even more adequate optical power than before.

According to the results of the simulation described above, the relationship between the amount of recession X and the light-transmitting layer 32a is represented by the following equation $$\sum_1^j n_i \cdot d_i = \frac{\lambda}{2} \cdot m$$

wherein "$n_i$" denotes the refractive index of the light-transmitting layer 32a, "$d_i$" denotes the amount of recession X of the opening 63, and "j" denotes the total number of layers arranged from the opening 63 to the magnetic recording layer 73. The total number of layers includes an air layer. The left-side member of this equation represents the optical path length between the opening 63 and the magnetic recording layer 73. The right-side member of the equation represents the maximum optical power reaching the magnetic recording layer 73, wherein "m" is a natural number.

Next, a method of manufacturing the flying head slider 22 in accordance with the present invention will be described briefly. As shown in 9, the reading head element 52 is laminated on a wafer 81. The surface of the reading head element 52 is planarized. On the surface of the reading head element 52, there is laminated a lower clad film 82. On the surface of the lower clad film 82, there is laminated a core film 83. Alumina, for example, is used for the lower clad film 82. $TiO_2$, for example, is used for the core film 83. A resist film 84 is formed on the surface of the core film 83 in a predetermined pattern.

Figure 10:
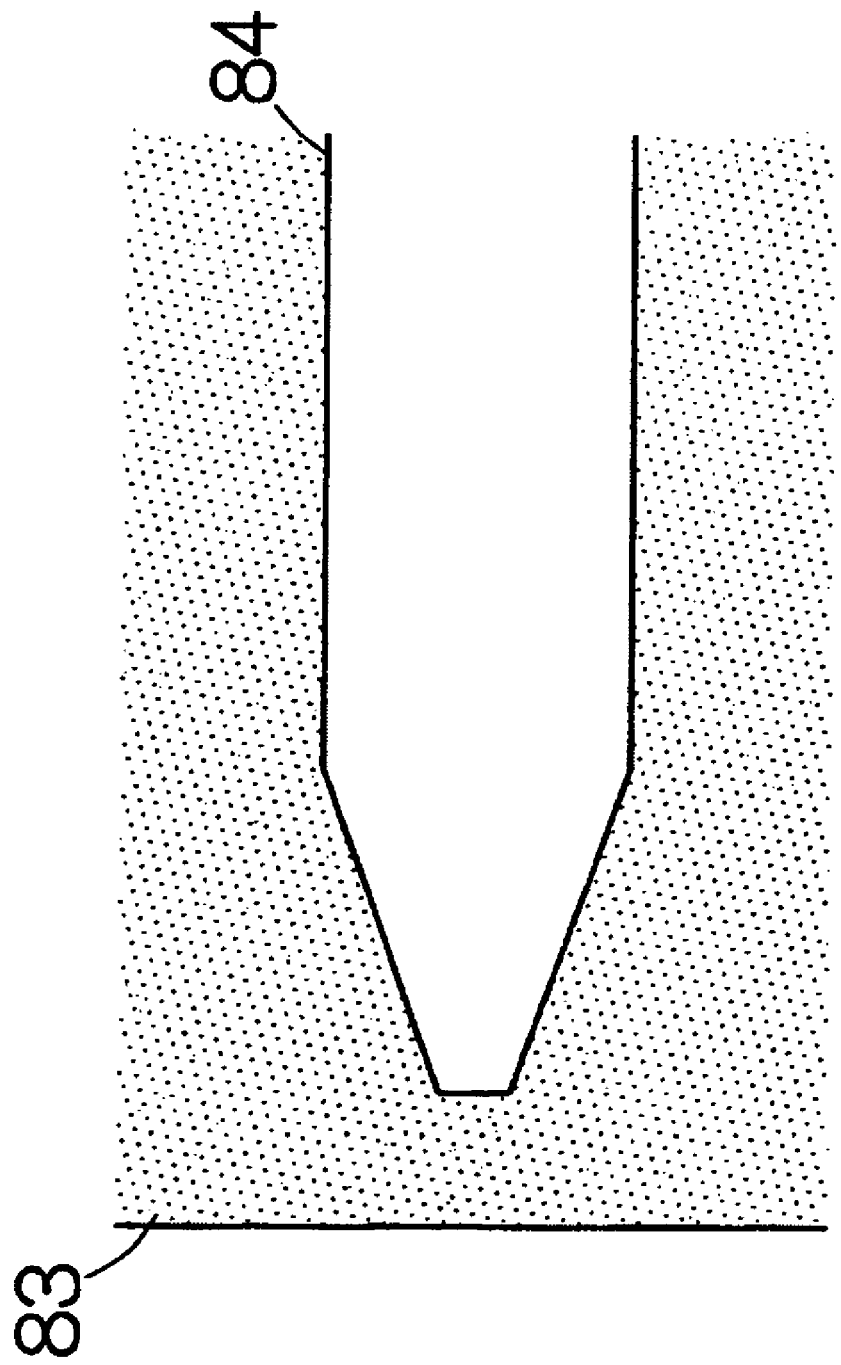
FIG. 10 is a plan view schematically illustrating a condition in which a resist film is formed on a core film.
Figure 11:
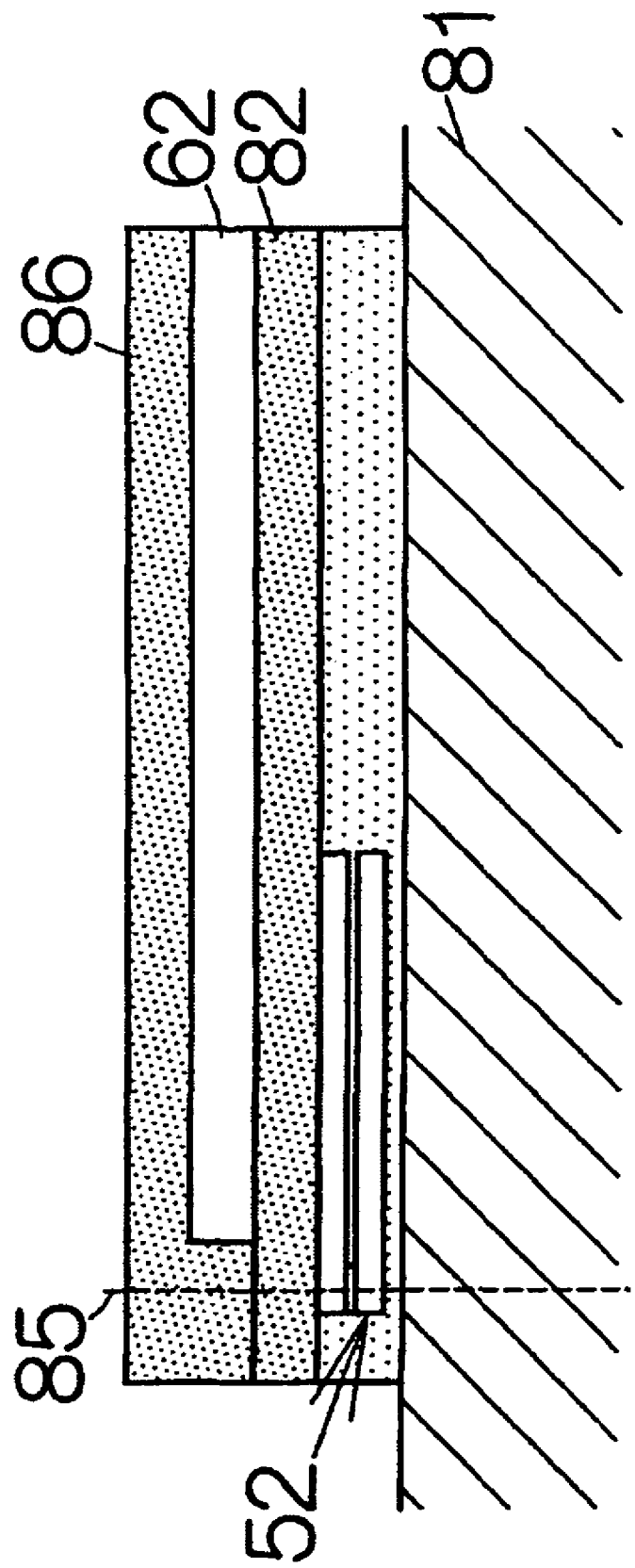
FIG. 11 is another cross-sectional view schematically illustrating a condition in which a clad and a core are formed on a reading head.

As shown in FIG. 10, the contour of the resist film 84 outlines the contour of the core 62. An etching treatment is applied to the core film 83 outside the resist film 84. A focused ion beam (FIB) apparatus or an ion milling apparatus may be used at the time of etching treatment. As a result, as shown in FIG. 11, the core 62 is etched out of the core film 83 based on the etching treatment. After the etching out, the resist film 84 is removed. On the surface of the lower clad film 82, there is laminated an upper clad film 86. Alumina is used for the upper clad film 86.

Figure 12:
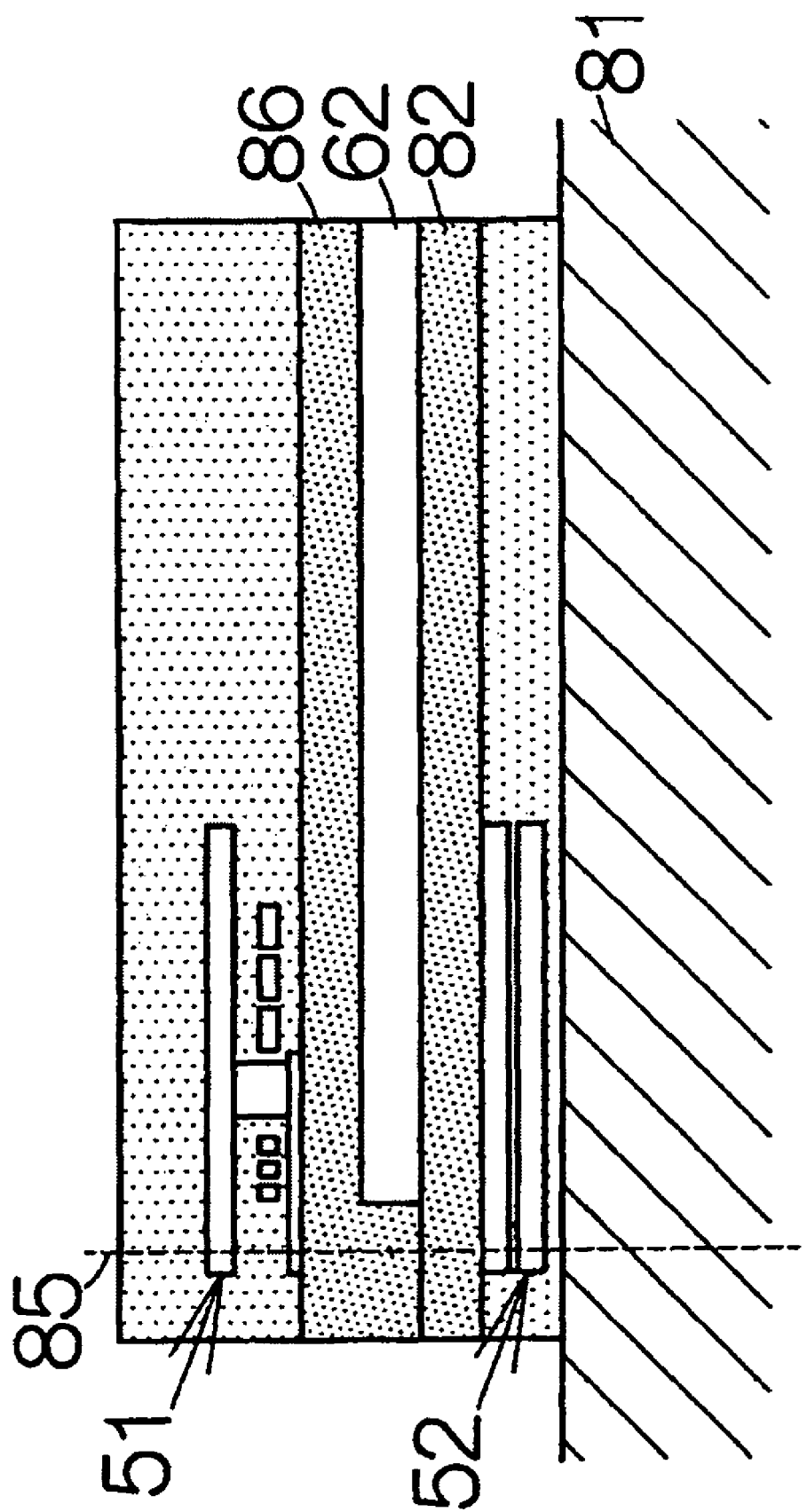
FIG. 12 is a cross-sectional view schematically illustrating a condition in which a writing head is formed on a clad.

On the surface of the upper clad film 86, there is laminated the single magnetic pole head 51, as shown in FIG. 12. In this way, the electromagnetic conversion element 33 is embedded in the element-containing film 32. Then, a wafer bar is cut out of the wafer 81. After the cutting out, a polishing treatment is applied to the slider body 31 and the element-containing film 32. The slider body 31 and the element-containing film 32 are polished as far as the reference surface 85. The size of the electromagnetic conversion element 33 is adjusted. In this way, the air bearing surface 34 is defined along the reference surface 85.

Figure 13:
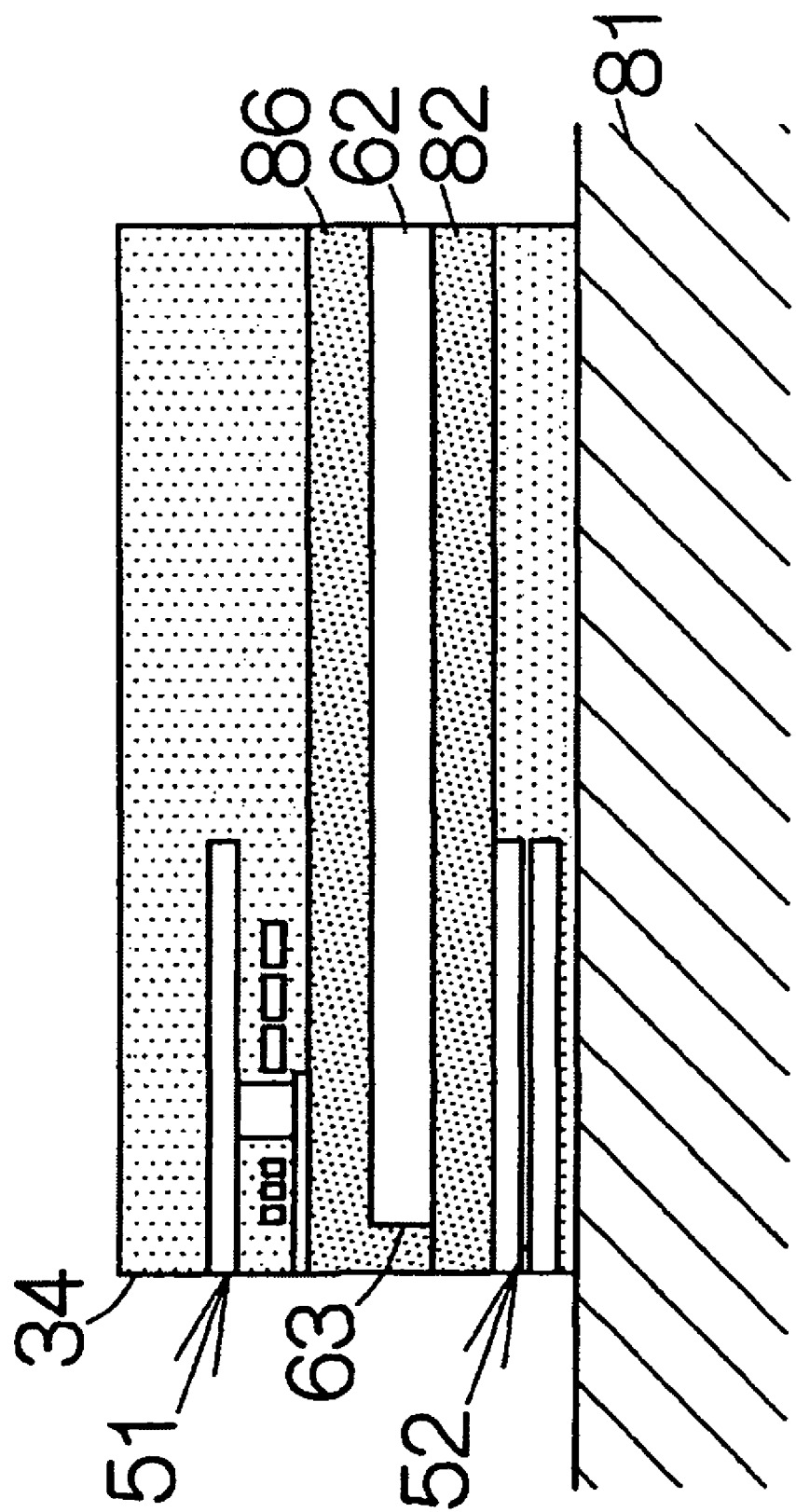
FIG. 13 is a cross-sectional view schematically illustrating a condition in which an air bearing surface is formed.

As shown in FIG. 13, the air bearing surface 34 is formed on the flying head slider 22. The opening 63 is set back by a predetermined amount of recession X from the air bearing surface 34. The amount of recession X can be set according to the amount of polish in a polishing treatment. Then, a protective film (not shown in the figure) is formed on the air bearing surface 34. Here, the lower clad film 82 and the upper clad film 86 compose the light-transmitting layer 32a and the clad 32b. Note that the element-containing film 32, the core 62 and the light-transmitting layer 32a compose the optical output device of the present invention.

In such a manufacturing method as described above, the core 62 is etched out by means of, for example, an etching treatment. The opening 63 can be formed with a high level of accuracy. In addition, the opening 63 is set back by a predetermined amount of recession X from the reference surface 85, i.e., the air bearing surface 42. A polishing treatment is only applied to the lower clad film 82 and the upper clad film 86. The opening 63 is not exposed to the polishing treatment. Thus, the opening 63 is reliably prevented from being damaged. In addition, the amount of recession X can be easily adjusted based on the amount of polish.

Figure 14:
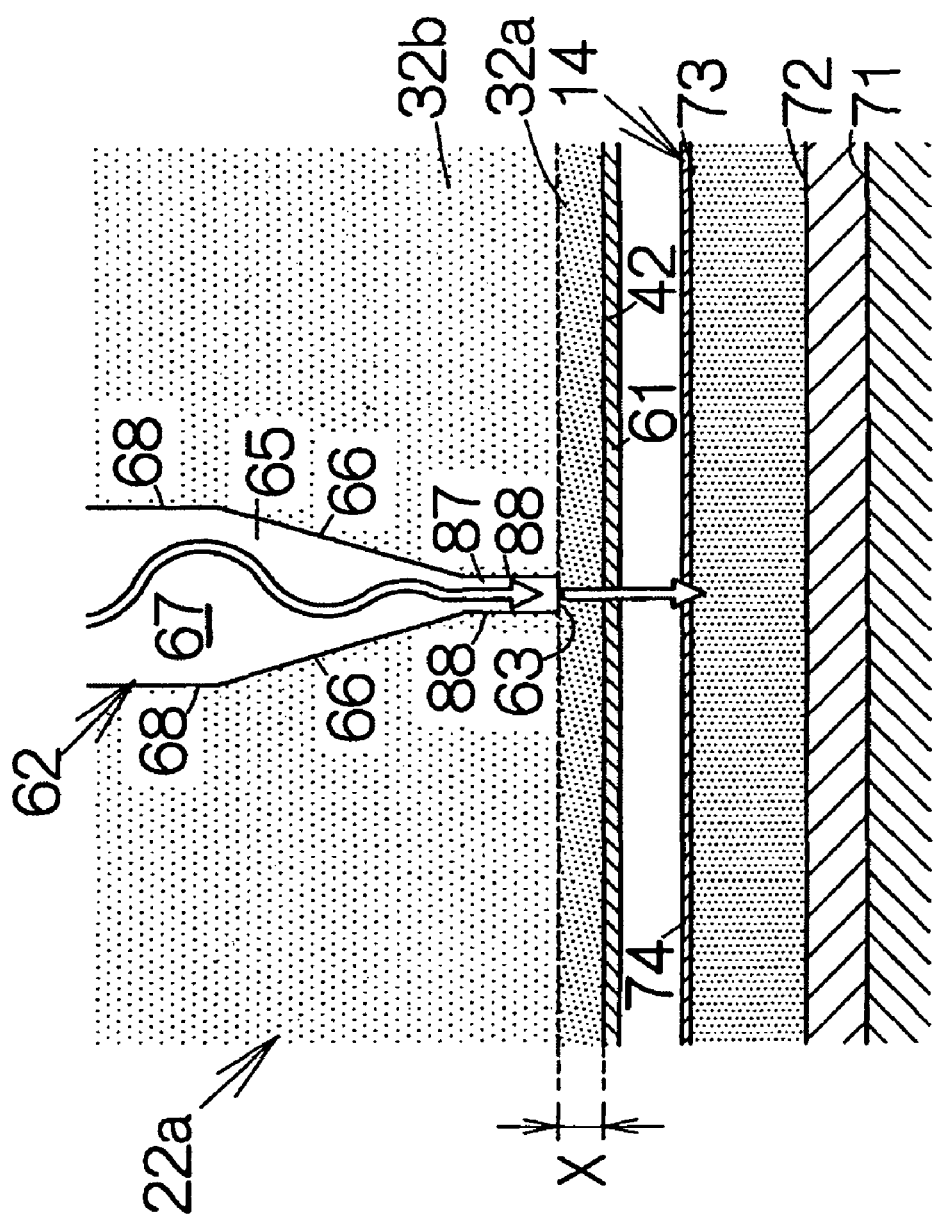
FIG. 14 is a cross-sectional view schematically illustrating the structure of a flying head slider in accordance with the second embodiment of the present invention.

FIG. 14 schematically shows the structure of a flying head slider 22a in accordance with the second embodiment of the present invention. In this flying head slider 22a, a uniform path 87 is connected to the anterior end of a tapered path 65. An opening 63 is divided off at the anterior end of the uniform path 87. The uniform path 87 is divided off by vertical boundary surfaces 88 facing to each other at a uniform interval. A material different from that of the clad 32b is used for the light-transmitting layer 32a. The light-transmitting layer 32a may be formed from, for example, alumina. The clad 32b may be formed from, for example, $SiO_2$ having a refractive index of 1.46. In this way, a difference in refractive index between the core 62 and the clad 32b is set to a relatively large value. Note that components identical in configuration and structure to those of the above-described flying head slider 22 are denoted by the same reference numerals and symbols.

Figure 15:
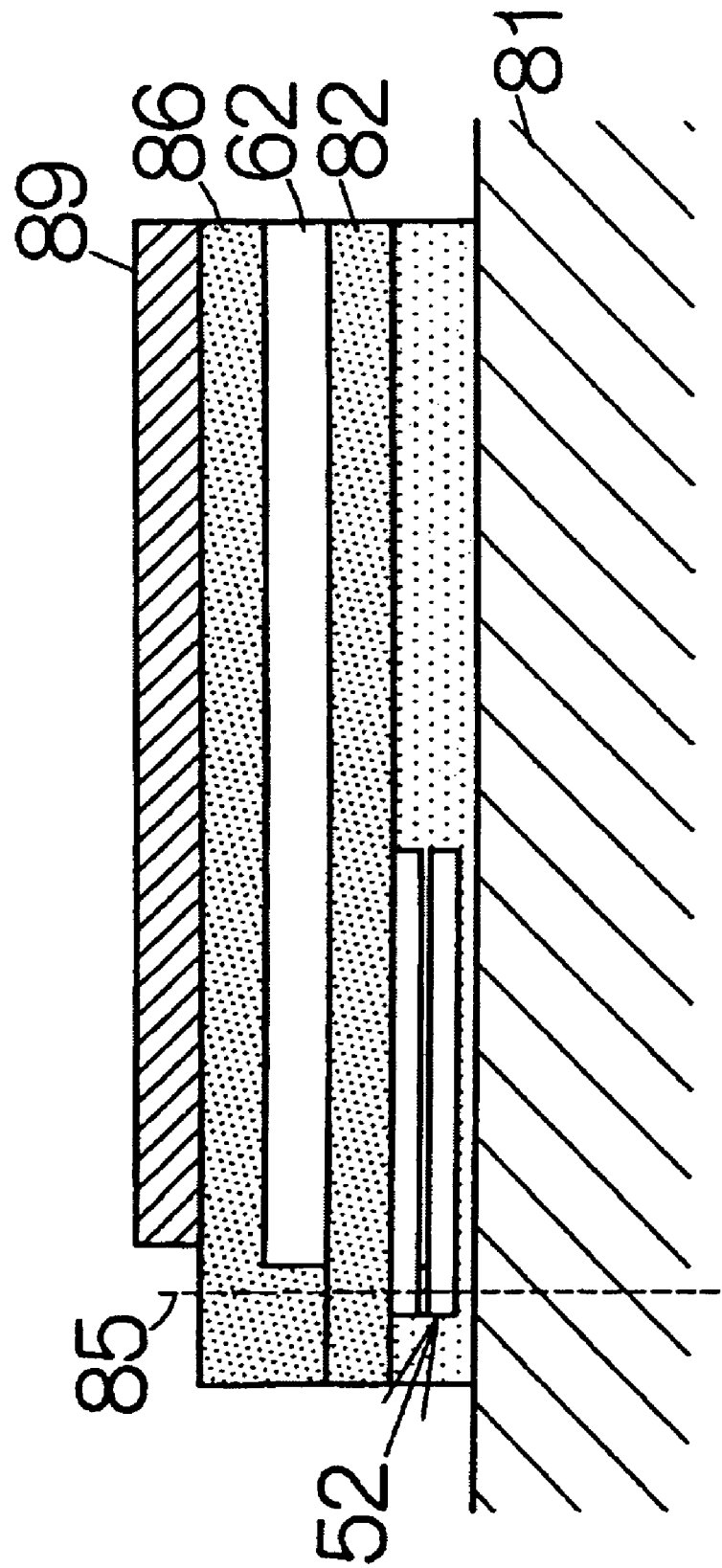
FIG. 15 is a cross-sectional view schematically illustrating a condition in which a core and a clad are formed on a reading head.

At the time of manufacturing the flying head slider 22a, the core 62 is laminated on the surface of the lower clad film 82 in the same way as described above. As shown in FIG. 15, the upper clad film 86 is laminated on the surface of the lower clad film 82. The lower clad film 82 and the upper clad film 86 are formed from $SiO_2$. Then, a resist film 89 is laminated on the surface of the upper clad film 86. The anterior end of the resist film 89 may be set back from the anterior end of the core 62. An etching treatment is applied to the upper clad film 86, the core 62 and the lower clad film 82 based on the resist film 89, thus forming the opening 63. After the formation of the opening 63, the resist film 89 is removed.

Figure 16:
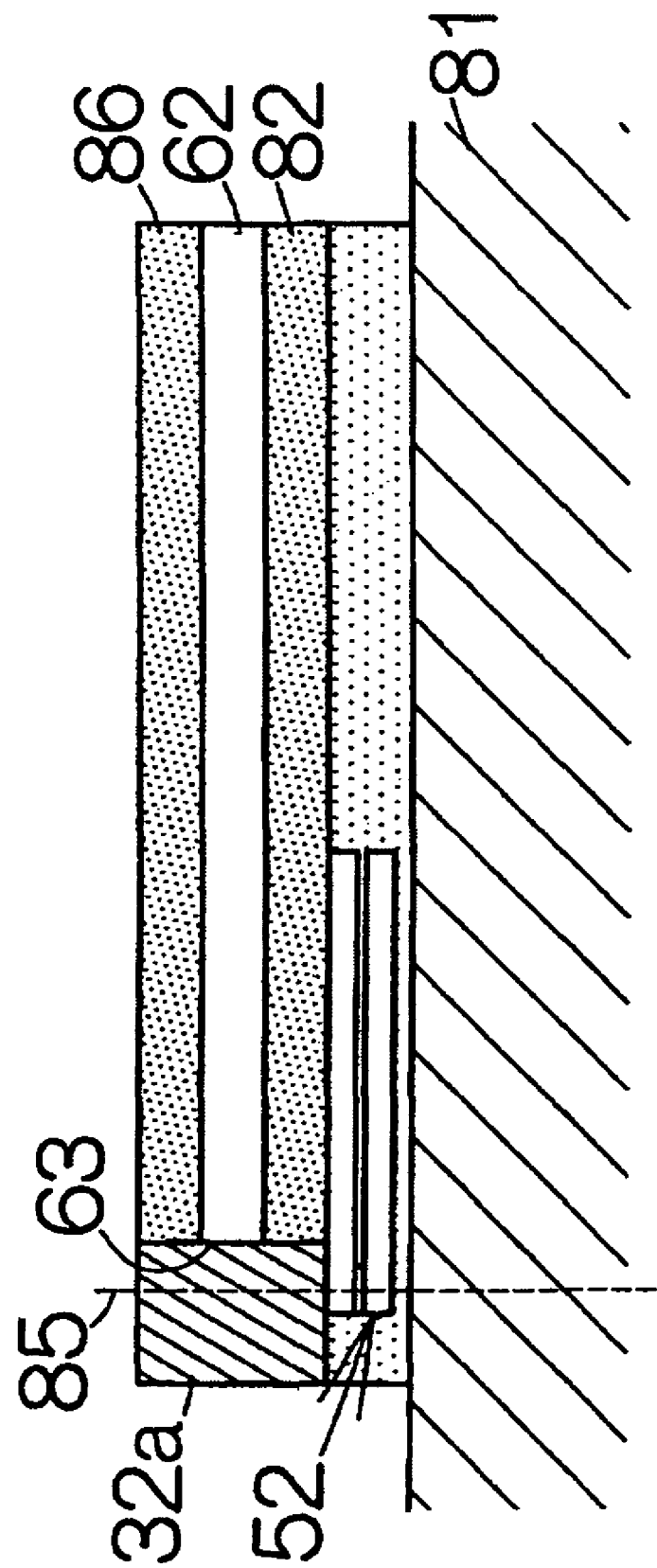
FIG. 16 is a cross-sectional view schematically illustrating a condition in which a light-transmitting layer is formed.

As shown in FIG. 16, the light-transmitting layer 32a is formed outside the core 62 and the upper clad film 86 on the surface of the lower clad film 82. Then, the single magnetic pole head 51 is formed on the surfaces of the light-transmitting layer 32a and the upper clad film 86 in the same way as described above. The slider body 31 and the element-containing film 32 are polished as far as the reference surface 85. The size of the electromagnetic conversion element 33 is adjusted. The air bearing surface 34 is formed along the reference surface 85. A protective film (not shown in the figure) is formed on the air bearing surface 34. The flying head slider 22a is thus manufactured.

In this flying head slider 22a, the uniform path 87 is divided off at the anterior end of the core 62. The uniform path 87 maintains the width of the opening 63. The anterior end of the resist film 89 is set back from the anterior end of the core 62. Consequently, the width and the position of the opening 63 are easily established as designed based on an etching treatment, as long as the amount of recession X defined as a distance from the reference surface 85 is set on the uniform path 87 of the core 62, i.e., as long as the anterior end of the resist film 89 is positioned on the uniform path 87. The opening 63 is formed in the core 62 with a high level of accuracy. In addition, the difference in refractive index between the core film 83 and the clad 32*b* is set to a relatively large value since the clad 32*b* is formed from $SiO_2$. Furthermore, the core film 83 and the clad 32*b* are not exposed to a polishing treatment due to the effect of the light-transmitting layer 32*a*. Thus, the core film 83 and the clad 32*b* are reliably prevented from being damaged.

FIG. 17 schematically shows the structure of a flying head slider 22*b* in accordance with the third embodiment of the present invention. In this flying head slider 22*b*, a core 62 divides off a first boundary surface 94 extending along a virtual plane and a second boundary surface 95 facing at a uniform interval to the first boundary surface 94. A third boundary surface 96 extends from the second boundary surface 95 toward an air bearing surface 42. The third boundary surface 96 gradually approaches the first boundary surface 94 as it nears the air bearing surface 42. The core 62 is faced to the main magnetic pole 56 of a single magnetic pole head 51 at the first boundary surface 94.

An opening 63 is divided off in the first boundary surface 94. A light-transmitting layer 32*a* is divided off between the first boundary surface 94 and a main magnetic pole 56. Note that components identical in configuration and structure to those of the above-described flying head slider 22 are denoted by the same reference numerals and symbols. In this flying head slider 22*b*, light reflects off the third boundary surface 96. The reflected light is irradiated at the magnetic recording layer 73 of a magnetic disk 14 faced to the anterior end of the main magnetic pole 56. The magnetic recording layer 73 is heated within a writing gap. This heating is carried out in an efficient manner.

In the flying head slider 22*b* described above, the opening 63 is established on the first boundary surface 94. Consequently, the optical path length represented by the left-side member of the equation noted above may be applied to a distance from the opening 63 to the magnetic recording layer 73. The amount of recession X may be defined by a distance along the optical path from the air bearing surface 42 to the opening 63. At the time of manufacturing this flying head slider 22*b*, a sloped surface for supporting the third boundary surface 96 of the core 62 may be formed on the surface of the above-noted lower clad film 82. When forming the sloped surface, an FIB apparatus or an ion milling apparatus may be used.

What is claimed is:

1. An optical output device comprising:
    a clad composed of a material having a first refractive index;
    a core embedded in said clad, composed of a material having a second refractive index different from said first refractive index, and tapering toward an end-point thereof, the core forming an optical path; and
    a light-transmitting layer composed of a material different from said material having said second refractive index that cuts across the optical path at the end-point thereof, wherein an optical power output from the end-point of said core varies according to a waveform amplitude which increases and decreases cyclically according to a travel distance of light, and an optical path length within said light-transmitting layer is set to a value for realizing an optical power larger than an optical power realized when said light-transmitting layer is omitted.

2. A storage medium drive unit comprising a storage medium and a head slider faced to said storage medium, wherein said head slider includes:
    a slider body;
    an insulating nonmagnetic film laminated on an air outflow end face of said slider body and faced to said storage medium with respect to a certain surface thereof; and
    an optical waveguide which is embedded in said nonmagnetic film and divides off an anterior end thereof at a position set back by a predetermined amount of recession from a certain surface of said nonmagnetic film,
    wherein an optical power reaching to a recording layer within said storage medium varies according to a waveform amplitude which increases and decreases cyclically according to a travel distance of light, and said amount of recession is set to a value for realizing an optical power larger than that realized when said amount of recession is set to 0.

3. A head slider comprising:
    a slider body;
    an insulating nonmagnetic film laminated on an air outflow end face of said slider body and faced to a storage medium with respect to a certain surface thereof; and
    an optical waveguide which is embedded in said nonmagnetic film and divides off an anterior end thereof at a position set back by a predetermined amount of recession from a certain surface of said nonmagnetic film,
    wherein an optical power reaching to a recording layer within said storage medium varies according to a waveform, an amplitude of which increases and decreases cyclically according to an increase in a travel distance of light and said amount of recession is set to a value for realizing an optical power larger than that realized when said amount of recession is set to 0.

4. A storage medium drive unit comprising a storage medium and a head slider faced to said storage medium, wherein said head slider includes:
    a slider body;
    an insulating nonmagnetic film laminated on an air outflow end face of said slider body and faced to said storage medium with respect to a certain surface thereof;
    an optical waveguide embedded in said nonmagnetic film, and
    a light-transmitting layer which cuts across an optical path at an anterior end of said optical waveguide,
    wherein an optical power output from the anterior end of said optical waveguide varies according to a waveform, an amplitude of which increases and decreases cyclically according to an increase in a travel distance of light, and an optical path length within said light-transmitting layer is set to a value for realizing an optical power larger than that realized when said light-transmitting layer is omitted.

5. A head slider comprising:
    a slider body;
    an insulating nonmagnetic film laminated on an air outflow end face of said slider body and faced to a storage medium with respect to a certain surface thereof;
    an optical waveguide embedded in said nonmagnetic film, and
    a light-transmitting layer which cuts across an optical path at an anterior end of said optical waveguide,
    wherein an optical power output from the anterior end of said optical waveguide varies according to a waveform amplitude which increases and decreases cyclically according to a travel distance of light, and an optical path length within said light-transmitting layer is set to a value for realizing an optical power larger than that realized when said light-transmitting layer is omitted.

* * * * *

UNITED STATES PATENT AND TRADEMARK OFFICE
CERTIFICATE OF CORRECTION

PATENT NO. : 8,014,235 B2
APPLICATION NO. : 12/028567
DATED : September 6, 2011
INVENTOR(S) : Tawa et al.

It is certified that error appears in the above-identified patent and that said Letters Patent is hereby corrected as shown below:

On the Title Page:

Item (56) in the second column, after the Section titled "FOREIGN PATENT DOCUMENTS", insert a Section titled --OTHER DOCUMENTS, Japanese Office Action issued in Japanese App. No. 2007-034005, mailed March 22, 2011.--

Signed and Sealed this
Twenty-ninth Day of November, 2011

David J. Kappos
*Director of the United States Patent and Trademark Office*